United States Patent
Aoki

(10) Patent No.: US 10,058,926 B2
(45) Date of Patent: Aug. 28, 2018

(54) POWER TOOL

(71) Applicant: MAKITA CORPORATION, Anjo-shi, Aichi (JP)

(72) Inventor: Yonosuke Aoki, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 93 days.

(21) Appl. No.: 15/012,138

(22) Filed: Feb. 1, 2016

(65) Prior Publication Data

US 2016/0221088 A1    Aug. 4, 2016

(30) Foreign Application Priority Data

Feb. 2, 2015    (JP) .................................. 2015-018752

(51) Int. Cl.
  *B23B 31/10*    (2006.01)
  *B25F 5/00*    (2006.01)
  (Continued)

(52) U.S. Cl.
  CPC ............ *B23B 31/10* (2013.01); *B24B 23/022* (2013.01); *B24B 23/04* (2013.01); *B24B 45/006* (2013.01);
  (Continued)

(58) Field of Classification Search
  CPC ......... B23B 31/10; B27B 19/006; B27B 5/30; B27B 5/32; B24B 23/02; B24B 23/04; B24B 45/006; B25F 5/006; Y10T 279/33
  See application file for complete search history.

(56) References Cited

U.S. PATENT DOCUMENTS 8,162,727 B2 *  4/2012  Zaiser ................... B24B 23/04
                                                451/357
8,960,688 B2 *  2/2015  Zhou ................... B23D 61/006
                                                279/141
(Continued)

FOREIGN PATENT DOCUMENTS

EP    1790434 A1 *  5/2007    ........... B24B 23/022
JP    H08-150556 A    6/1996
(Continued)

OTHER PUBLICATIONS

Machine translation, EPO patent document, EP1790434, "Motor driven hand tool with a rapid clamping device", Baumann et al., May 2007.*

(Continued)

*Primary Examiner* — Eric A Gates
*Assistant Examiner* — Chwen-Wei Su
(74) *Attorney, Agent, or Firm* — Oliff PLC

(57)    ABSTRACT

It is an object of the invention to provide a technique for realizing rational arrangement of components considering arrangement of a tool accessory mounting mechanism in a power tool. A representative electric vibration tool 100 is provided which mainly includes a body housing 101, an inner housing 110, a driving motor 115 and a spindle 124. A blade 145 as a tool accessory is held between the spindle 124 and a clamp shaft 127 and driven by the driving motor 115. A rotation axis of the driving motor 115 and the spindle 124 are arranged in parallel to each other. A clamp shaft 127 is held by a clamp member 131 of a clamp shaft holding mechanism 130. The clamp member 131 is arranged within the body housing 101.

16 Claims, 9 Drawing Sheets

(51) Int. Cl.
*B24B 23/04* (2006.01)
*B27B 5/30* (2006.01)
*B24B 45/00* (2006.01)
*B24B 23/02* (2006.01)

(52) U.S. Cl.
CPC ............... *B25F 5/00* (2013.01); *B25F 5/006* (2013.01); *B27B 5/30* (2013.01); *Y10T 279/33* (2015.01)

(56) References Cited

U.S. PATENT DOCUMENTS

| | | | | |
|---|---|---|---|---|
| 9,545,699 | B2* | 1/2017 | Furusawa | ............... B24B 23/04 |
| 2010/0003906 | A1 | 1/2010 | Zaiser et al. | |
| 2011/0209888 | A1 | 9/2011 | Elsworthy | |
| 2012/0086177 | A1* | 4/2012 | Zhou | ........................ B25F 5/00 |
| | | | | 279/140 |
| 2012/0160533 | A1* | 6/2012 | Kamegai | ................. B25D 17/24 |
| | | | | 173/162.2 |
| 2014/0191481 | A1 | 7/2014 | Kawakami et al. | |
| 2015/0075830 | A1* | 3/2015 | Zhang | ..................... B24B 23/04 |
| | | | | 173/213 |

FOREIGN PATENT DOCUMENTS

| | | | | |
|---|---|---|---|---|
| JP | 2001-328053 | A | 11/2001 | |
| JP | WO 2013115142 | A1 * | 8/2013 | ............. B24B 23/04 |
| JP | 2014-131824 | A | 7/2014 | |
| WO | 2008/128802 | A1 | 10/2008 | |

OTHER PUBLICATIONS

Jul. 1, 2016 Extended European Search Report issued in European Patent Application No. 16153670.1.
Jun. 19, 2018 Office Action issued in Japanese Patent Application No. 2015-018752.

* cited by examiner

POWER TOOL

TECHNICAL FIELD

The present invention relates to a power tool which performs an operation on a workpiece.

BACKGROUND ART

WO2008/128802 discloses a hand-held power tool in which a tool accessory is mounted to an output shaft and driven by a driving motor. In this power tool, a driving shaft is fixedly mounted to a rotor of the driving motor, and rotation of the driving shaft is transmitted to the output shaft to which the tool accessory is mounted, via an eccentric connecting device. Further, the driving shaft mounted to the driving motor and the output shaft to which the tool accessory is mounted are arranged such that their axes are parallel to each other.

SUMMARY OF THE INVENTION

In the above-described power tool, the eccentric connecting device can be arranged close to the tool accessory, but from the viewpoint of arrangement of a mechanism for mounting the tool accessory and user friendliness, further improvement is desired in the overall arrangement of components of the power tool.

Accordingly, it is an object of the present invention to provide a technique for realizing rational arrangement of components considering arrangement of a tool accessory mounting mechanism in a power tool.

The above-described problem is solved by the present invention. According to a preferred embodiment of the present invention, a power tool is provided which performs a prescribed operation on a workpiece by driving a tool accessory. The power tool has a motor, a tool accessory driving shaft, a body housing, a tool accessory holding member and a holding mechanism. The tool accessory driving shaft is arranged in parallel to a rotation axis of the motor and configured to be driven by the motor to drive the tool accessory. Typically, the tool accessory driving shaft is rotationally driven by the motor to reciprocatingly drive the tool accessory within a prescribed angular range around a rotation driving axis of the tool accessory driving shaft. Specifically, the tool accessory is reciprocatingly driven in a direction crossing the rotation driving axis. The tool accessory suitably includes plural kinds of tools such as a cutting tool for cutting a workpiece and a grinding tool for grinding a workpiece. Thus, the tool accessory performs a cutting or grinding operation by reciprocating drive (vibration) of the tool accessory within a prescribed angular range. This power tool is also referred to as a vibration tool. The body housing houses at least part of the tool accessory driving shaft and the motor. The body housing may be configured to house only part of the motor or its entirety. The tool accessory holding member is configured to be movable between a clamp position to clamp the tool accessory between the tool accessory holding member and the tool accessory driving shaft in order to hold the tool accessory and a release position to release the clamping of the tool accessory in order to remove the tool accessory. The tool accessory holding member is held in the clamp position by the holding mechanism. The holding mechanism includes an engagement member that can engage with the tool accessory holding member in the clamp position, and a biasing member that biases the engagement member so as to provide the engagement member with a force of holding the tool accessory holding member in the clamp position. The engagement member is disposed within the body housing. Typically, the biasing member is arranged close to the tool accessory holding member together with the engagement member.

According to the present invention, the engagement member holds the tool accessory holding member within the body housing. When the tool accessory holding member is placed in the clamp position, a free space is relatively easily formed around the tool accessory holding member and the tool accessory driving shaft. Therefore, the engagement member can be disposed by utilizing the free space. Thus, components of the power tool can be rationally arranged. Further, for example, in a structure in which the engagement member is disposed on the outside of the body housing, an unintentional external force may act upon the engagement member so that the engagement member may be released from the tool accessory holding member. In this invention, however, the engagement member is disposed within the body housing, so that the engagement member can be protected from an unintentional external force.

According to a further embodiment of the power tool of the present invention, the power tool includes a transmitting member that is connected to the tool accessory driving shaft and transmits rotation of the motor to the tool accessory driving shaft. The tool accessory is held on one end region of the tool accessory driving shaft and the engagement member is disposed on the other end region of the tool accessory driving shaft in an axial direction of the tool accessory driving shaft. The transmitting member is connected to the tool accessory driving shaft between the ends of the tool accessory driving shaft. Typically, the transmitting member may be disposed close to the tool accessory. More preferably, the biasing member may be disposed between the other end of the tool accessory driving shaft and the transmitting member and biases the engagement member in the axial direction of the tool accessory driving shaft. A free space is easily formed on the opposite side of a connection part of the tool accessory driving shaft with the transmitting member from the tool accessory. Therefore, the engagement member can be disposed by utilizing the free space. Further, the biasing member can also be disposed by utilizing this free space. Furthermore, when the transmitting member is disposed close to the tool accessory, a couple of force which is generated according to the distance between the transmitting member and the tool accessory is reduced. Thus, vibration which is caused by machining the workpiece with the tool accessory is reduced.

According to a further embodiment of the power tool of the present invention, the biasing member includes two spring elements disposed oppositely to each other across the tool accessory driving shaft. Preferably, the two spring elements may be configured to bias the engagement member in the axial direction of the tool accessory driving shaft. The motor is arranged on a first axis (extending in a front-rear direction) perpendicular to the rotation axis (extending in a vertical direction) of the tool accessory driving shaft since the tool accessory driving shaft is arranged in parallel to the rotation axis of the motor. Therefore, a free space is easily formed on the both sides of the tool accessory driving shaft on a second axis (extending in a right and left direction) perpendicular to the rotation axis of the tool accessory driving shaft and to the first axis. The biasing member can be rationally disposed by utilizing this free space.

According to a further embodiment of the power tool of the present invention, the body housing has an elongate shape extending in a direction crossing the axial direction of the tool accessory driving shaft. Further, the power tool includes a biasing force releasing mechanism that releases a biasing force of the biasing member from the engagement member and allows the tool accessory holding member to move to the release position. The biasing force releasing mechanism is arranged to overlap the tool accessory driving shaft when viewed from a direction perpendicular to the axial direction of the tool accessory driving shaft and to the crossing direction. Typically, the biasing force releasing mechanism is arranged on the right side and/or the left side of the tool accessory driving shaft when the body housing and the tool accessory driving shaft are defined as extending in the front-rear direction and the vertical direction, respectively. Specifically, the biasing force releasing mechanism includes a biasing force releasing member that releases a biasing force of the biasing member from the engagement member, and the biasing force releasing member is arranged on the right side and/or the left side of the tool accessory driving shaft. The biasing force releasing member suitably includes a structure of engaging with an intermediate member between the biasing member and the engagement member and a structure of directly engaging with the biasing member. When the biasing force releasing member is arranged on the right and left sides of the tool accessory driving shaft, a single operation member which is operated by a user is connected to the two biasing force releasing members.

According to a further embodiment of the power tool of the present invention, the body housing includes an inner housing and an outer housing which houses the inner housing, and the inner housing houses at least part of the tool accessory driving shaft and the motor. More preferably, the body housing may include a first housing component arranged close to the tool accessory and a second housing component arranged apart from the tool accessory in the axial direction of the tool accessory driving shaft, and the first and second housing components are connected together. Typically, the outer housing may include the first and second housing components. In this case, the inner housing may include a third housing component arranged close to the tool accessory and a fourth housing component arranged apart from the tool accessory. Preferably, the inner housing and the outer housing may be connected via an elastic member, so that transmission of vibration from the inner housing to the outer housing is reduced.

According to the present invention, a technique for realizing rational arrangement of components considering arrangement of a tool accessory mounting mechanism is provided in a power tool.

DETAILED EXPLANATION OF THE EMBODIMENT OF THE INVENTION

Figure 1:
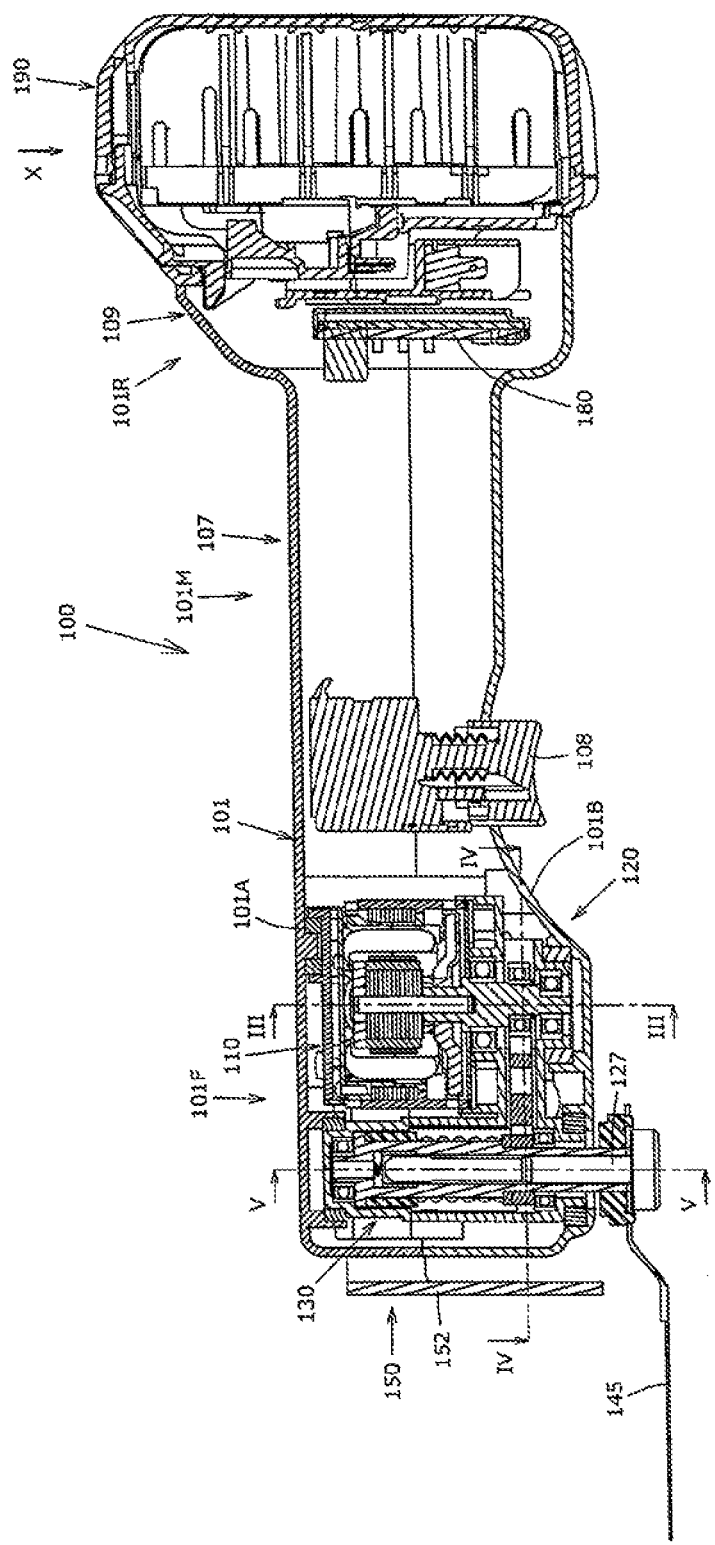
FIG. 1 is a sectional view showing the overall structure of an electric vibration tool according to a representative embodiment of the present invention.

A representative embodiment of the present invention is now described with reference to FIGS. 1 to 9. In this embodiment, an electric vibration tool is described as a representative example of a power tool according to the present invention. As shown in FIG. 1, the electric vibration tool 100 is a power tool to which a tool selected from plural kinds of tools such as a blade and a polishing pad is attached, and performs an operation such as a cutting operation and a polishing operation, appropriate to the selected tool on a workpiece by vibrating the tool attached thereto. In FIG. 1, as a representative example of the tool, a blade 145 is attached to the power tool.

As shown in FIG. 1, the electric vibration tool 100 has a body housing 101 which forms an outer shell of the vibration tool 100. The body housing 101 is an elongate housing and has an upper housing 101A and a lower housing 101B which are joined together by screws 102 (see FIG. 4). The body housing 101 is an example embodiment that corresponds to the "body housing" and the "outer housing" according to the present invention. The upper housing 101A and the lower housing 101B are example embodiments that correspond to the "second housing component" and the "first housing component", respectively, according to the present invention. The blade 145 is removably attached to one end region of the body housing 101 in its extending direction, and a battery mounting part 109 to which a battery 190 is removably mounted is provided in the other end region of the body housing 101. The battery 190 is mounted to the battery mounting part 109 by sliding in a direction of arrow X, and removed therefrom by sliding in the opposite direction. A controller 180 is disposed within the battery mounting part 109 and extends in the sliding direction of the battery 190.

For the sake of expedience, the upper housing 101A side and the lower housing 101B side (upper side and lower side as viewed in FIG. 1) are taken as an upper side and a lower side of the vibration tool 100, respectively. Further, the blade 145 side and the battery mounting part 109 side (left side and right side as viewed in FIG. 1) are taken as a front side and a rear side of the vibration tool 100, respectively.

The body housing 101 forms a grip part 107 to be held by a user. The grip part 107 is provided in an intermediate region 101M between a front region 101F and a rear region 101R of the body housing 101 and forms an elongate grip extending in the front-rear direction. The battery 190 is attached to and detached from the battery mounting part 109 by sliding in a vertical direction crossing the extending direction (front-rear direction) of the grip part 107. A trigger 108 is provided in the grip part 107 and protrudes downward of the vibration tool 100. The trigger 108 and the battery mounting part 109 are electrically connected to the controller 180. Therefore, a driving motor 115 is turned on and off by operating the trigger 108. The controller 180 may be configured such that the rotation speed of the motor 115 is changed based on the operation amount of the trigger 108. Specifically, when the operation amount of the trigger 108 is small, the motor 115 is driven at low rotation speed, and when the operation amount of the trigger 108 is large, the motor 115 is driven at high rotation speed.

The body housing 101 houses an inner housing 110 which holds a driving mechanism 120, a clamp shaft holding mechanism 130 and a holding mechanism operation mechanism 150 in the front region 101E in front of the trigger 108. The inner housing 110 is an example embodiment that corresponds to the "inner housing" according to the present invention.

(Driving Mechanism)

Figure 2:
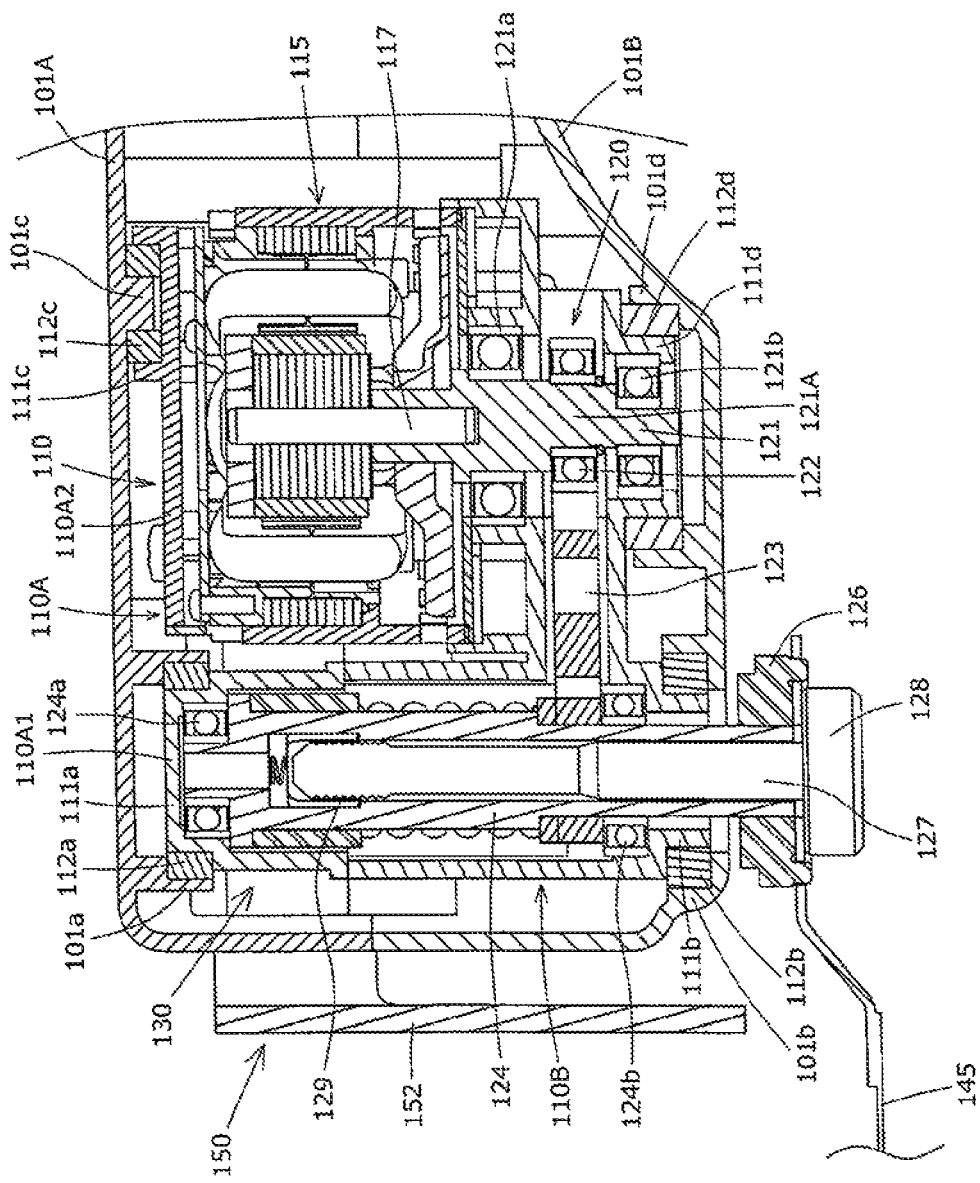
FIG. 2 is a partly enlarged sectional view showing an internal structure of the vibration tool.
Figure 3:
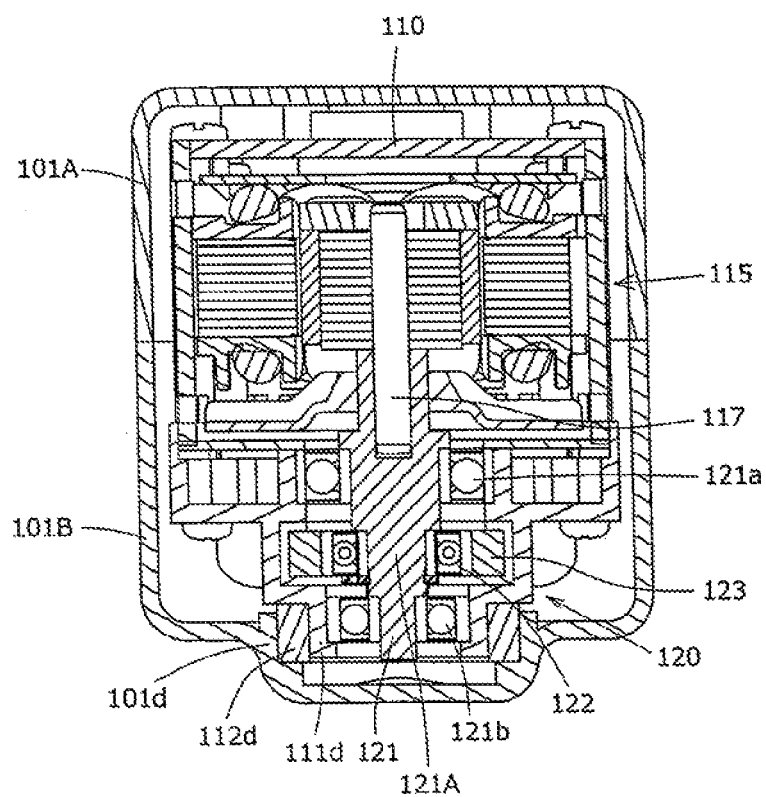
FIG. 3 is a sectional view taken along line III-III in FIG. 1.
Figure 4:
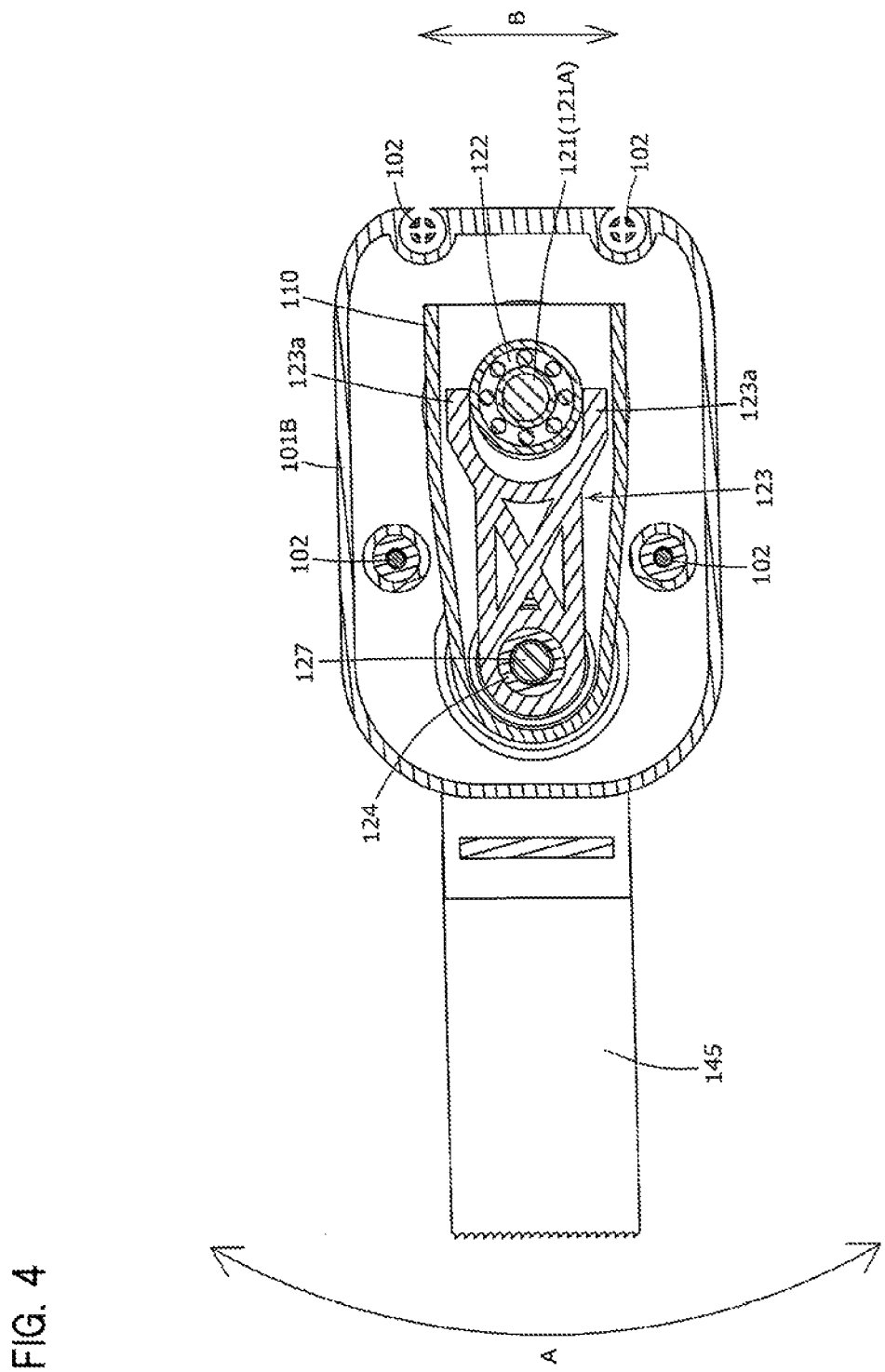
FIG. 4 is a sectional view taken along line IV-IV in FIG. 1.

As shown in FIGS. 2 to 4, a driving mechanism 120 is configured as a mechanism for driving the blade 145 (tool accessory). The driving mechanism 120 is housed within the inner housing 110 disposed within the body housing 101. The driving mechanism 120 mainly includes the driving motor 115, an eccentric shaft 121, a drive bearing 122, a driven arm 123, a spindle 124 and a clamp shaft 127.

The driving motor 115 is configured as a brushless motor. The driving motor 115 is an example embodiment that corresponds to the "motor" according to the present invention. The driving motor 115 is arranged such that an output shaft 117 vertically extends. The eccentric shaft 121 is mounted on a tip of the output shaft 117 of the driving motor 115. The eccentric shaft 121 has an eccentric part 121A which is eccentric to a rotation axis of the output shaft 117. The eccentric shaft 121 is rotatably supported by an upper bearing 121a and a lower bearing 121b. The upper and lower bearings 121a, 121b are held by the inner housing 110. The drive bearing 122 is fitted on the outer periphery of the eccentric part 121A. The drive bearing 122 is disposed between the upper and lower bearings 121a, 121b.

The driven arm 123 is provided to extend in the right and left direction and connect the drive bearing 122 and the spindle 124. Two arm parts 123a are formed in a rear part of the driven arm 123. The arm parts 123a are disposed in contact with the outer periphery of the drive bearing 122. A front part of the driven arm 123 is fastened to the spindle 124.

The spindle 124 is an elongate member having a generally cylindrical hollow shape. The spindle 124 is an example embodiment that corresponds to the "tool accessory driving shaft" according to the present invention. The spindle 124 is arranged in parallel to the output shaft 117 of the driving motor 115. The spindle 124 is rotatably supported by an upper bearing 124a and a lower bearing 124b. The upper and lower bearings 124a, 124b are held by the inner housing 110. The driven arm 123 is arranged adjacent to the lower bearing 124b between the upper and lower bearings 124a, 124b. In other words, the driven arm 123 is arranged close to the blade 145 (tool accessory) held between the clamp shaft 127 and a flange 126 provided on the lower end of the spindle 124.

As shown in FIG. 2, the clamp shaft 127 is a generally cylindrical member which is inserted into the spindle 124. A flange-like clamp head 128 is integrally formed on one (lower) end of the clamp shaft 127, and clamp member engagement grooves 129 are formed in the other (upper) end part of the clamp shaft 127. When the clamp shaft 127 is inserted into the spindle 124 and held by the clamp shaft holding mechanism 130, the blade 145 is held between the clamp head 128 of the clamp shaft 127 and the flange 126 of the spindle 124. The clamp shaft 127 is an example embodiment that corresponds to the "tool accessory holding member" according to the present invention.

When the driving motor 115 is driven and the output shaft 117 is rotated, the center of the eccentric part 121A moves around the rotation axis of the output shaft 117. Thus, the drive bearing 122 reciprocates in the right and left direction (vertically as viewed in FIG. 4 or in the direction of arrow B (also referred to as a direction B)), and the driven arm 123 is driven to reciprocatingly rotate on the central axis of the spindle 124 in the direction of arrow A (also referred to as a direction A). As a result, the blade 145 held between the spindle 124 and the clamp shaft 127 is driven to reciprocatingly rotate in the direction A, so that a prescribed operation such as a cutting operation can be performed. The driven arm 123 is an example embodiment that corresponds to the "transmitting member" according to the present invention.

(Clamp Shaft Holding Mechanism)

Figure 5:
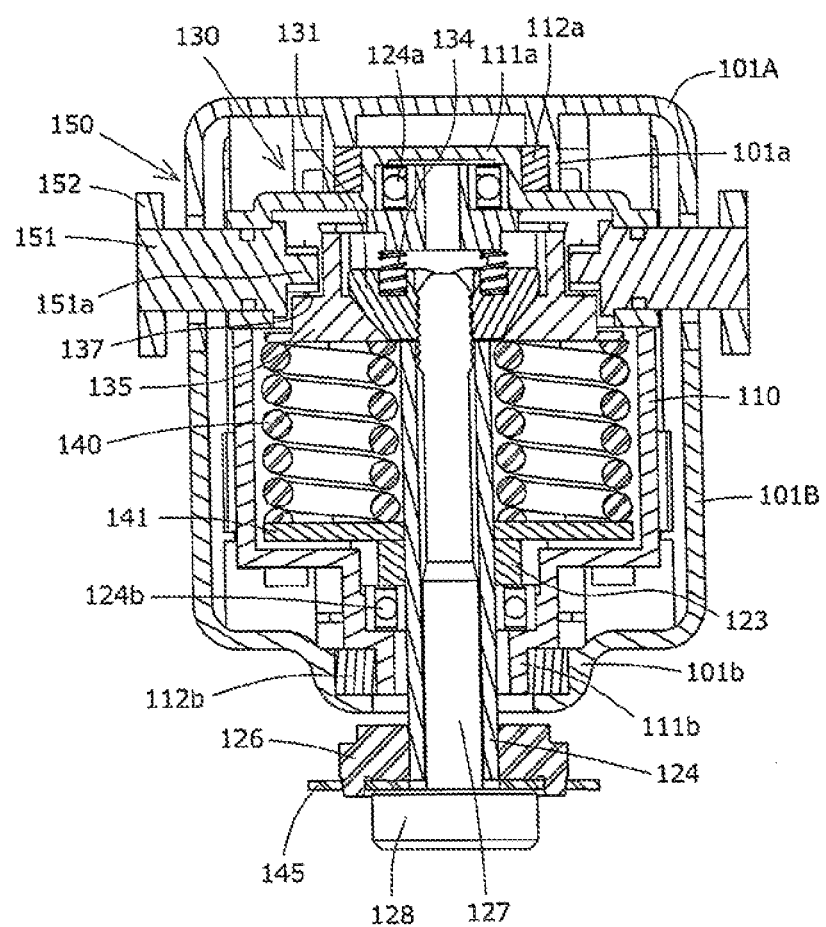
FIG. 5 is a sectional view taken along line V-V in FIG. 1.
Figure 6:
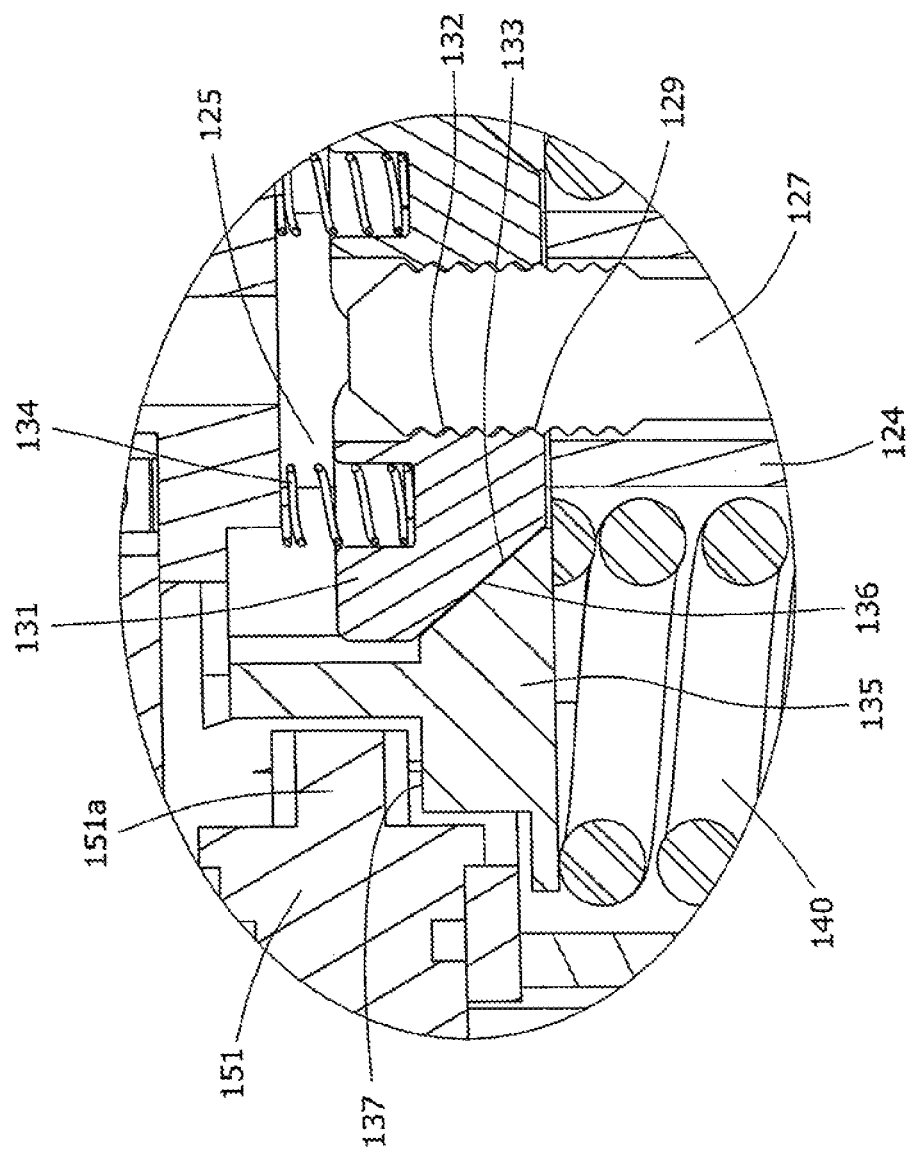
FIG. 6 is a partly enlarged sectional view of FIG. 5.

As shown in FIGS. 2, 5 and 6, the clamp shaft holding mechanism 130 serves to hold the clamp shaft 127. The clamp shaft holding mechanism 130 mainly includes a clamp member 131, a first coil spring 134, an annular member 135 and a second coil spring 140. The clamp shaft holding mechanism 130 is an example embodiment that corresponds to the "holding mechanism" according to the present invention.

The clamp member 131 consists of a pair of members which hold the clamp shaft 127 in a radial direction of the clamp shaft 127. The clamp member 131 is disposed through a clamp member through hole 125 which is formed facing the spindle 124. Each clamp member 131 is configured to be movable in the radial direction of the spindle 124. As shown in FIG. 6, the clamp member 131 has a plurality of projections 132 which can engage with the clamp member engagement grooves 129 of the clamp shaft 127. The clamp member 131 further has an inclined surface 133 inclined in a longitudinal direction of the spindle 124 (vertical direction of the vibration tool 100). The clamp member 131 is an example embodiment that corresponds to the "engagement member" according to the present invention.

As shown in FIG. 6, the first coil spring 134 is disposed between the upper end of the clamp member through hole 125 and each of the clamp members 131. The first coil spring 134 biases the clamp member 131 downward so as to stabilize the attitude of the clamp member 131.

As shown in FIG. 5, the annular member 135 serves to control clamping of the clamp shaft 127 by the clamp members 131. The annular member 135 is disposed to surround the clamp members 131 in the radial direction of the spindle 124. The annular member 135 can move along the spindle 124 in the longitudinal direction of the spindle 124.

As shown in FIG. 6, the annular member 135 has an inclined surface 136 which engages with the inclined surface 133 of the clamp member 131. Specifically, the annular member 135 has the inclined surface 136 inclined in the longitudinal direction of the spindle 124 (vertical direction of the vibration tool 100). The annular member 135 further has a shoulder part 137 which can engage with an eccentric shaft part 151a of a rotary shaft 151.

As shown in FIG. 5, the second coil spring 140 is disposed under the annular member 135 and biases the annular member 135. The second coil spring 140 is disposed on the right and left sides across the spindle 124. This arrangement of the second coil springs 140 can prevent increase of the size of the vibration tool 100 in the front-rear direction. Further, a plate-like spring receiving member 141 is provided on top of the driven arm 123 fastened to the spindle 124. Two second coil springs 140 are disposed between the spring receiving member 141 and the annular member 135. Thus, the annular member 135 is biased upward in the longitudinal direction of the spindle 124 and held by the biasing force of the second coil springs 140. Specifically, the second coil springs 140 are disposed above the driven arm 123. The second coil spring 140 is an example embodiment that corresponds to the "biasing member" and the "spring element" according to the present invention.

As shown in FIG. 5, the annular member 135 is biased by the second coil springs 140 and the clamp member 131 is biased by the first coil springs 134, so that the inclined surface 136 of the annular member 135 engages with the inclined surface 133 of the clamp member 131. Thus, the clamp member 131 is moved inward in the radial direction of the clamp shaft 127 (the spindle 124). As a result, the two clamp members 131 hold the clamp shaft 127 in engagement between the projections 132 of the clamp members 131 and the clamp member engagement grooves 129 of the clamp shaft 127. The clamp shaft 127 is held between the clamp members 131 and biased upward by the second coil spring 140. In this manner, the blade 145 is held between the clamp head 128 of the clamp shaft 127 and the flange or tool holding part 126 of the spindle 124.

(Holding Mechanism Operation Mechanism)

As shown in FIGS. 2, 5 and 6, the holding mechanism operation mechanism 150 serves to move the annular member 135 in the vertical direction (the longitudinal direction of the spindle 124). The clamp members 131 can be switched between the positions of holding and releasing the clamp shaft 127 by the vertical movement of the annular member 135. The holding mechanism operation mechanism 150 mainly includes the rotary shaft 151 and an operation part 152. The holding mechanism operation mechanism 150 is an example embodiment that corresponds to the "biasing force releasing mechanism" according to the present invention.

As shown in FIGS. 5 and 6, the rotary shaft 151 can rotate around a prescribed rotation axis extending in the right and left direction of the vibration tool 100 which is perpendicular to the longitudinal direction of the spindle 124 (the vertical direction of the vibration tool 100).

The rotary shaft 151 can engage with the annular member 135. A pair of rotary shafts 151 are disposed oppositely to each other and arranged to rotate on the same rotation axis. The eccentric shaft part 151a is formed on one end of each of the rotary shafts 151 on the clamp member 131 side in the right and left direction. The eccentric shaft part 151a is formed in a position displaced from the rotation axis of the rotary shaft 151.

Figure 7:
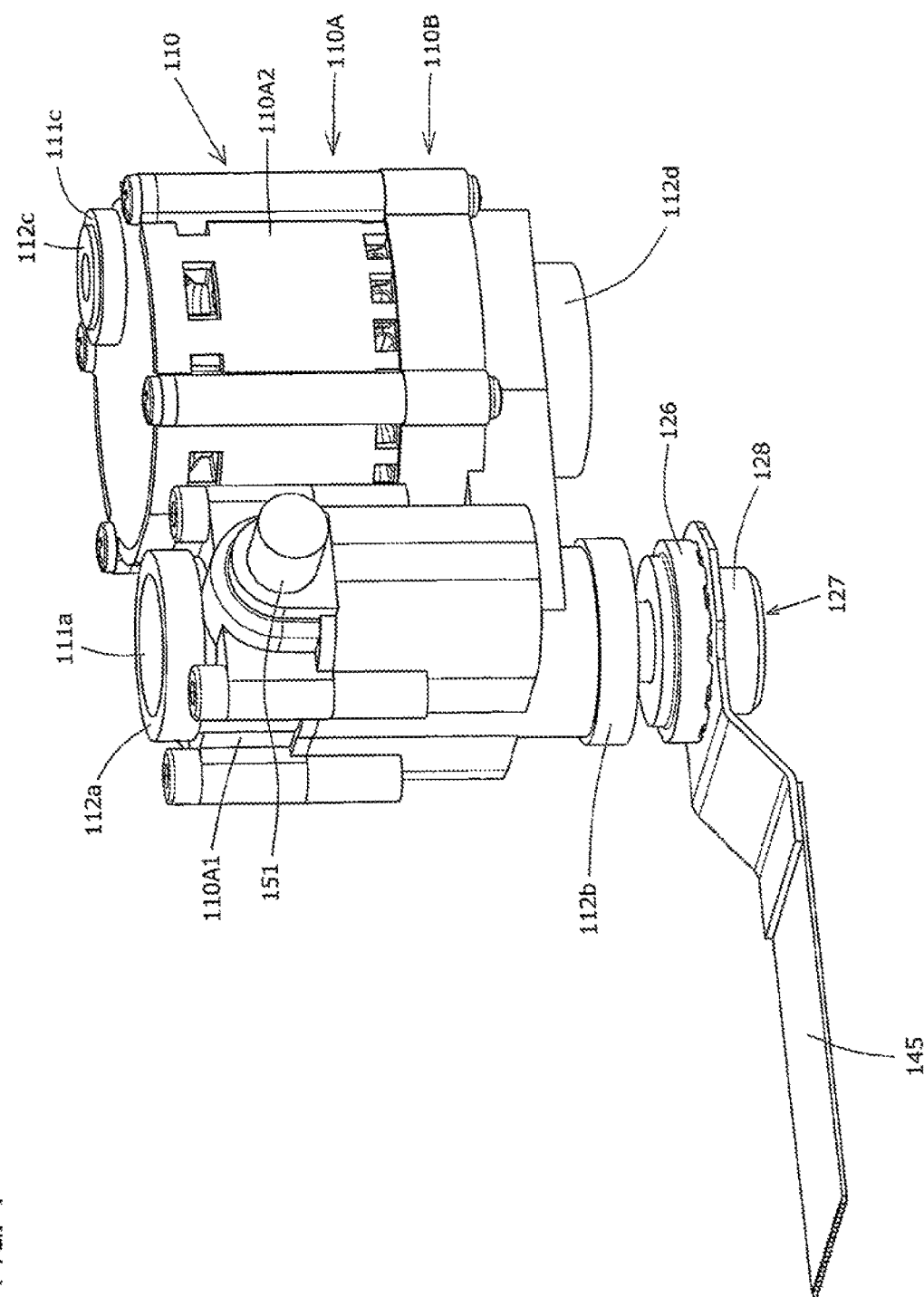
FIG. 7 is a perspective view showing an inner housing.

As shown in FIG. 7, the rotary shaft 151 is disposed through the inner housing 110 and held by the inner housing 110. As shown in FIG. 5, the rotary shaft 151 is also disposed through the body housing 101 and connected to the operation part 152 on the outside of the body housing 101. Specifically, the operation part 152 is connected to the two rotary shafts 151 on both sides of the body housing 101. When a user operates (turns) the operation part 152, the rotary shafts 151 rotate around the rotation axis. Thus, the eccentric shaft part 151a is moved in the longitudinal direction of the spindle 124 and moves the annular member 135.

When the operation part 152 is placed in a position shown in FIGS. 1 and 5, as shown in FIG. 5, the eccentric shaft part 151a does not engage with the shoulder part 137 of the annular member 135. At this time, the annular member 135 is biased upward by the second coil spring 140, so that the inclined surface 136 of the annular member 135 engages with the inclined surface 133 of the clamp member 131. Thus, the two clamp members 131 are moved toward the clamp shaft 127 and hold the clamp shaft 127. Positions in which the annular member 135 and the operation part 152 are placed when the clamp shaft 127 is clamped are defined as respective clamp positions.

Figure 8:
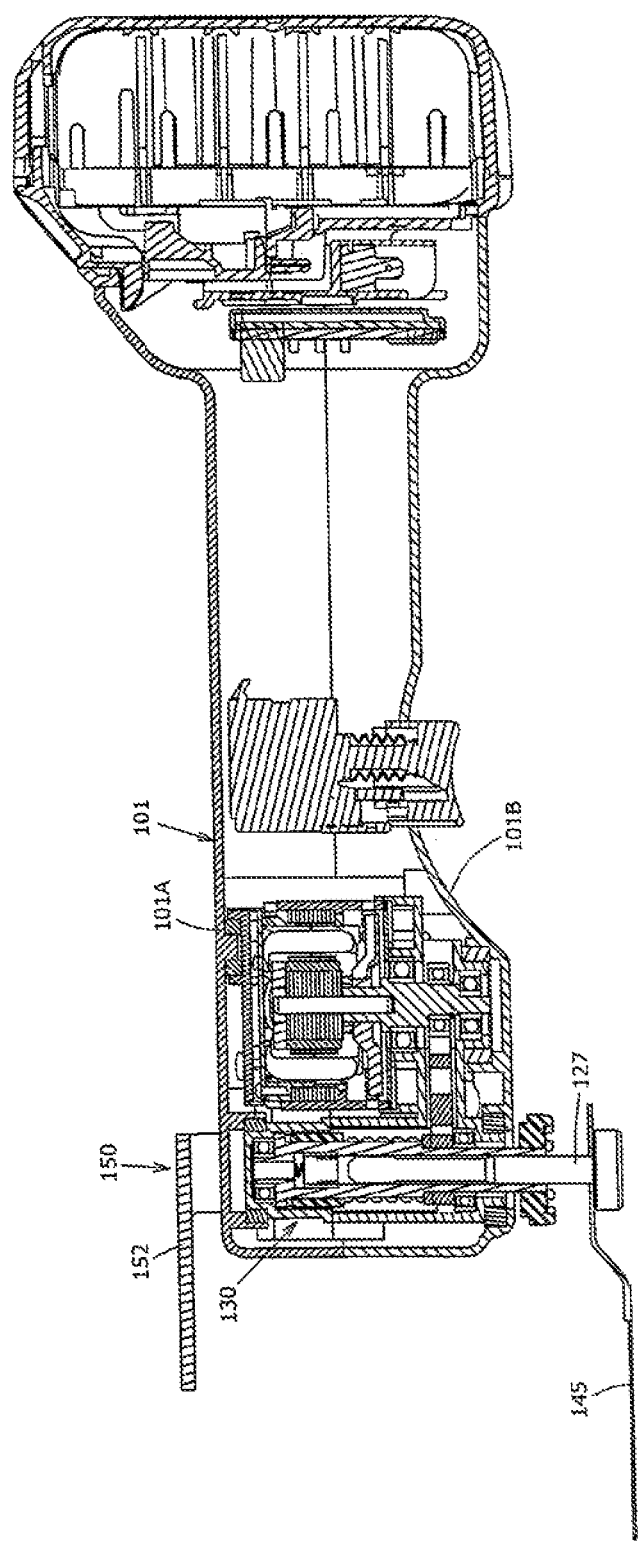
FIG. 8 is a sectional view corresponding to FIG. 1, showing a state in which a tool accessory can be removed.
Figure 9:
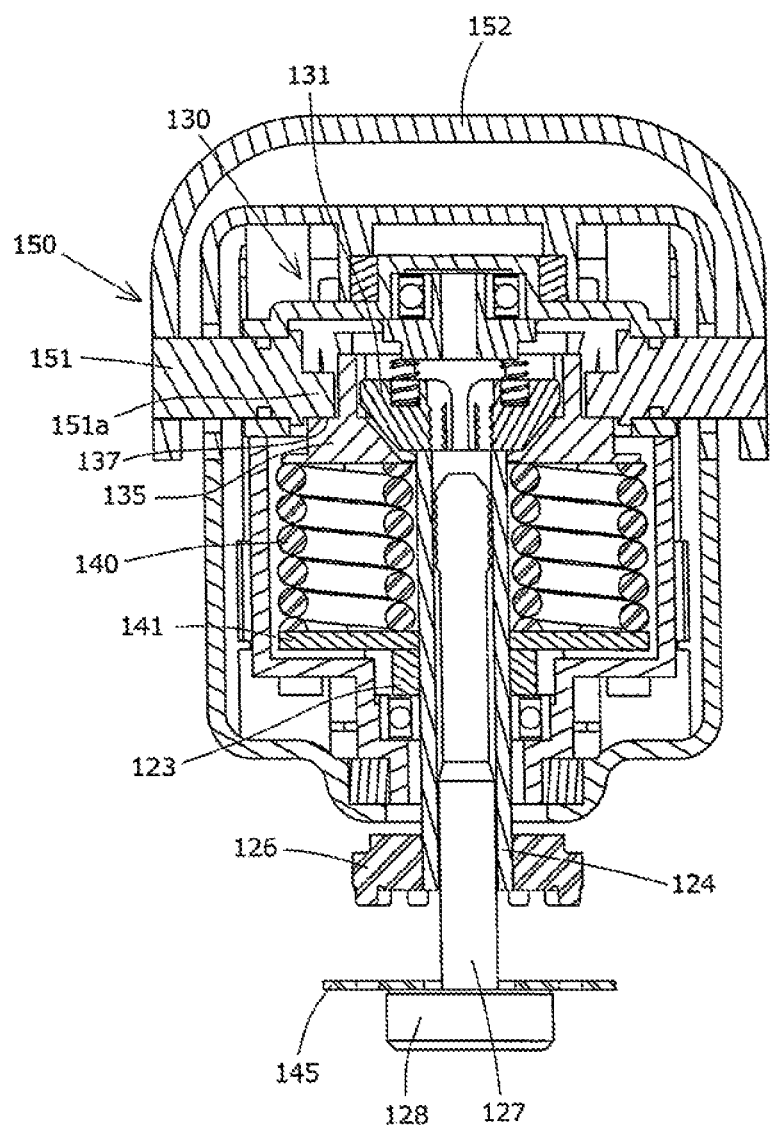
FIG. 9 is a sectional view corresponding to FIG. 5, showing the state in which the tool accessory can be removed.

When the operation part 152 is placed in a position shown in FIGS. 8 and 9, as shown in FIG. 9, the eccentric shaft part 151a engages with the shoulder part 137 of the annular member 135 and moves the annular member 135 downward against the biasing force of the second coil spring 140. As a result, the inclined surface 136 of the annular member 135 is disengaged from the inclined surface 133 of the clamp member 131. Thus, the force of clamping the clamp shaft 127 with the clamp member 131 is reduced. In this state, the clamp shaft 127 can be removed from the spindle 124 by pulling the clamp shaft 127 out downward. Positions in which the annular member 135 and the operation part 152 are placed when the clamp shaft 127 is released are defined as respective release positions. The blade 145 is also released by the release of the clamp shaft 127. Thus, the blade 145 as a tool accessory can be replaced.

As described above, the blade 145 can be removed by moving the operation part 152 from the clamp position to the release position. On the other hand, when the clamp shaft 127 is inserted into the spindle 124 with the blade 145 mounted thereto and the operation part 152 is moved from the release position to the clamp position, the clamp shaft 127 is clamped and the blade 145 is held between the clamp shaft 127 and the spindle 124.

(Vibration-Proofing Mechanism)

When the vibration tool 100 is driven, the driving mechanism 120 drives the blade 145, which causes vibration in the driving mechanism 120. Further, vibration is also caused in the blade 145 and the driving mechanism 120 connected to the blade 145 when the workpiece is machined with the blade 145. Therefore, a vibration-proofing mechanism is provided between the driving mechanism 120 and the body housing 101 in order to reduce transmission of vibration to a user who is holding the grip part 107 of the body housing 101. As shown in FIG. 2, the driving mechanism 120 is housed within the inner housing 110, and a vibration-proof rubber 112 is disposed between the inner housing 110 and the body housing 101. Specifically, a double housing structure is provided in which the inner housing 110 is housed within the body housing 101.

As shown in FIGS. 2 and 7, the inner housing 110 is configured as a housing formed of metal materials (such as aluminum and magnesium) or resin materials. The inner housing 110 is formed by connecting an upper inner housing 110A and a lower inner housing 110B with connecting means such as screws. The inner housing 110 holds the driving mechanism 120, the clamp shaft holding mechanism 130 and the holding mechanism operation mechanism 150. Specifically, the lower inner housing 110B is provided corresponding to the driving motor 115 and the spindle 124. The upper inner housing 110A includes a first upper inner housing 110A1 formed corresponding to the spindle 124 and a second upper inner housing 110A2 aimed corresponding to the driving motor 115. Specifically, the spindle 124 is housed in the lower inner housing 110B and the first upper inner housing 110A1, and the driving motor 115 is housed in the lower inner housing 110B and the second upper inner housing 110A2. Further, the lower inner housing 110B is formed of metal material, and the first upper inner housing 110A1 is formed of the same metal material as the lower inner housing 110B. The second upper inner housing 110A2 is formed of resin material.

A first rubber holding part 111a and a third rubber holding part 111c are formed on the upper inner housing 110A. A second rubber holding part 111b and a fourth rubber holding part 111d are formed on the lower inner housing 110B.

The first rubber holding part 111a is configured as a cylindrical projection protruding upward. A first rubber receiving part 101a is formed on the upper housing 101A of the body housing 101 and opposed to the first rubber holding part 111a. The first rubber receiving part 101a is configured as a cylindrical recess. The first rubber holding part 111a and the first rubber receiving part 101a are formed coaxially with the spindle 124. The bearing 124a for supporting the upper end of the spindle 124 is held in the inside of the first rubber holding part 111a.

The second rubber holding part 111b is configured as a cylindrical projection protruding downward. The second rubber holding part 111b is formed coaxially with the spindle 124. A second rubber receiving part 101b is formed on the lower housing 101B of the body housing 101 and opposed to the second rubber holding part 111b. The second rubber receiving part 101b is configured as a cylindrical recess. The second rubber holding part 111b and the second rubber receiving part 101b are formed coaxially with the spindle 124.

Cylindrical first vibration-proof rubber 112a and second vibration-proof rubber 112b are fitted on the outer peripheral parts of the first and second rubber holding parts 111a, 111b, respectively. The first and second vibration-proof rubbers 112a, 112b are disposed coaxially with the spindle 124. Thus, the first vibration-proof rubber 112a is disposed between the first rubber holding part 111a and the first rubber receiving part 101a, and the second vibration-proof rubber 112b is disposed between the second rubber holding part 111b and the second rubber receiving part 101b.

The third rubber holding part 111c is configured as a cylindrical recess. A third rubber receiving part 101c is formed on the upper housing 101A of the body housing 101 and opposed to the third rubber holding part 111c. The third rubber receiving part 101c is configured as a cylindrical projection protruding downward.

A cylindrical third vibration-proof rubber 112c is fitted on the inner peripheral part of the third rubber holding part 111c. Thus, the third vibration-proof rubber 112c is disposed between the third rubber holding part 111c and the third rubber receiving part 101c.

The fourth rubber holding part 111d is configured as a cylindrical projection protruding downward. A fourth rubber receiving part 101d is formed on the lower housing 101B of the body housing 101 and opposed to the fourth rubber holding part 111d. The fourth rubber receiving part 101d is configured as a cylindrical recess. The fourth rubber holding part 111d and the fourth rubber receiving part 101d are formed coaxially with the output shaft 117 of the driving motor 115. The bearing 121b for supporting the lower end of the eccentric shaft 121 is held in the inside of the fourth rubber holding part 111d.

A cylindrical fourth vibration-proof rubber 112d is fitted on the outer peripheral part of the fourth rubber holding part 111d. The fourth vibration-proof rubber 112d is disposed coaxially with the output shaft 117 of the driving motor 115. Thus, the fourth vibration-proof rubber 112d is disposed between the fourth rubber holding part 111d and the fourth rubber receiving part 101d.

In the above-described manner, the inner housing 110 is connected to the body housing 101 via the four vibration-proof rubbers 112. With this structure, transmission of vibration from the inner housing 110 to the body housing 101 is reduced. Specifically, when the vibration tool 100 is driven, transmission of vibration caused by the driving mechanism 120 to the body housing 101 is reduced. Further, transmission of vibration caused by machining the workpiece to the body housing 101 is also reduced. As a result, vibration of user's hand holding the grip part 107 is reduced, so that operability is improved.

According to the above-described embodiment, the output shaft 117 of the driving motor 115 is arranged in parallel to the spindle 124. Thus, the blade 145 as the tool accessory is disposed below the spindle 124, and the driven arm 123 which is driven by the output shaft 117 is disposed below the driving motor 115. Therefore, the tool accessory can be disposed closer to the driven arm 123 for driving the spindle 124. Accordingly, a couple of force which is generated according to the distance between the driven arm 123 and the tool accessory is reduced. Thus, vibration which is caused by machining the workpiece with the tool accessory is reduced.

Further, according to this embodiment, with the structure in which the second coil spring 140 is disposed on the outside of the spindle 124, the diameter of the spindle 124 can be reduced. Further, compared with a structure in which a single coil spring is disposed coaxially with the spindle 124, increase of the size of the vibration tool 100 in the front-rear direction can be prevented. Specifically, the second coil springs 140 are disposed on the right and left sides of the spindle 124, and no coil spring is disposed in front of the spindle 124. Therefore, part of the body housing 101 which is disposed in front of the spindle 124 can be shortened. Similarly, with the arrangement of the second coil springs 140 on the right and left sides of the spindle 124, no coil spring is disposed between the spindle 124 and the driving motor 115. Therefore, the driven arm 123 can be shortened. As a result, the vibration tool 100 can be shortened in the front-rear direction.

Further, according to this embodiment, the driving mechanism 120 is disposed in front of the trigger 108. Thus, the driving mechanism 120 for driving the tool accessory or particularly the driving motor 115 is not disposed in the grip part 107 which is held by a user. Therefore, the grip part 107 can be thinly shaped to be easily gripped, so that the operability of the vibration tool 100 is improved.

Further, according to this embodiment, with the structure in which the vibration-proof rubber 112 is disposed between the inner housing 110 and the body housing 101, transmission of vibration caused by driving the driving mechanism 120 to the body housing 101 is reduced. Further, the inner housing 110 which houses the driving mechanism 120 is disposed in a front region of the body housing 101. The controller 180 for driving and controlling the driving motor 115 is disposed in a rear region of the body housing 101. Thus, the controller 180 is disposed apart from a vibration source or the driving mechanism 120, so that the controller 180 is protected against vibration.

Further, according to this embodiment, the upper housing 101A and the lower housing 101B are joined together by the screws 102 which extend vertically in parallel to the spindle 124 and the output shaft 117 of the driving motor 115. The screws 102 are disposed by utilizing a free space laterally outward of the spindle 124 and the output shaft 117 of the driving motor 115. Specifically, the upper housing 101A and the lower housing 101B are joined together by the screws 102 which are provided in the free space. Thus, increase of the size of the body housing 101 (the vibration tool 100) is prevented.

In the above-described embodiment, the electric vibration tool 100 is descried as a representative example of the power tool, but the present invention is not limited to an electric vibration tool. For example, the present invention may also be applied to a power tool such as a grinder and a circular saw in which the tool accessory rotates. Further, a brushless motor is used as the driving motor 115, but a motor with a brush may be used.

In view of the nature of the above-described invention, the power tool of the present invention can have the following features. Each of the features can be used separately or in combination with the other, or in combination with the claimed invention.

(Aspect 1)

The biasing force releasing mechanism comprises an operation part which is operated by a user, and a biasing force releasing member that is connected to the operation part and releases a biasing force of the biasing member.

(Aspect 2)

The biasing force releasing member is configured to rotate around a rotation axis extending in a direction perpendicular to the axial direction of the tool accessory driving shaft and to a crossing direction in which the body housing extends and which crosses said axial direction.

(Aspect 3)

The biasing force releasing member has an eccentric shaft formed in a position displaced from the rotation axis.

(Aspect 4)

A vibration-proofing elastic member is disposed between the inner housing and the outer housing.

(Aspect 5)

An operation member is provided in the outer housing and operated by a user in order to drive the power tool, and the outer housing has a grip part provided to be held by the user and formed on the opposite side of the operation member from the motor in a direction in which the outer housing extends.

Correspondences Between the Features of the Embodiment and the Features of the Invention The above-described embodiment is a representative example for embodying the present invention, and the present invention is not limited to the structures that have been described as the representative embodiment. Correspondences between the features of the embodiment and the features of the invention are as follow:

The electric vibration tool 100 is an example embodiment that corresponds to the "power tool" according to the present invention.

The body housing 101 is an example embodiment that corresponds to the "body housing" and the "outer housing" according to the present invention.

The upper housing 101A and the lower housing 101B are example embodiments that correspond to the "second housing component" and the "first housing component", respectively, according to the present invention.

The inner housing 110 is an example embodiment that corresponds to the "inner housing" according to the present invention.

The driving motor 115 is an example embodiment that corresponds to the "motor" according to the present invention.

The driven arm 123 is an example embodiment that corresponds to the "transmitting member" according to the present invention.

The spindle 124 is an example embodiment that corresponds to the "tool accessory driving shaft" according to the present invention.

The clamp shaft 127 is an example embodiment that corresponds to the "tool accessory holding member" according to the present invention.

The clamp shaft holding mechanism 130 is an example embodiment that corresponds to the "holding mechanism" according to the present invention.

The clamp member 131 is an example embodiment that corresponds to the "engagement member" according to the present invention.

The second coil spring 140 is an example embodiment that corresponds to the "biasing member" and the "spring element" according to the present invention.

The holding mechanism operation mechanism 150 is an example embodiment that corresponds to the "biasing force releasing mechanism" according to the present invention.

The blade 145 is an example embodiment that corresponds to the "tool accessory" according to the present invention.

DESCRIPTION OF NUMERALS 100 electric vibration tool
101 body housing
101A upper housing
101B lower housing
101F front region
101M intermediate region
101R rear region
101a first rubber receiving part
101b second rubber receiving part
101c third rubber receiving part
101d fourth rubber receiving part
102 screw
107 grip part
108 trigger
109 battery mounting part
110 inner housing
110A upper inner housing
110A1 first upper inner housing
110A2 second upper inner housing
110B lower inner housing
111a first rubber holding part
111b second rubber holding part
111c third rubber holding part
111d fourth rubber holding part
112a first vibration-proof rubber
112b second vibration-proof rubber
112c third vibration-proof rubber
112d fourth vibration-proof rubber
115 driving motor
117 output shaft
120 driving mechanism
121 eccentric shaft
121A eccentric part
121a bearing
121b bearing
122 drive bearing
123 driven arm
123a arm part
124 spindle
124a bearing
124b bearing
125 clamp member through hole
126 tool holding part
127 clamp shaft
128 clamp head
129 clamp member engagement groove
130 clamp shaft holding mechanism
131 clamp member
132 projection 133 inclined surface
134 first coil spring
135 annular member
136 inclined surface
137 shoulder part
140 second coil spring
141 spring receiving part
145 blade
150 holding mechanism operation mechanism
151 rotary shaft
151a eccentric shaft part
152 operation part
180 controller
190 battery

What I claim is:

1. A power tool, which performs a prescribed operation on a workpiece by driving a tool accessory, comprising:
    a motor;
    a tool accessory driving shaft that is arranged in parallel to a rotation axis of the motor and is driven by the motor to drive the tool accessory;
    a body housing that houses at least part of the tool accessory driving shaft and the motor, wherein a first portion of the body housing that houses at least part of the tool accessory driving shaft is fixed relative to a second portion of the body housing that houses the motor, the body housing including a partition wall separates the first portion and the second portion;
    a tool accessory holding member that can move between a clamp position to clamp the tool accessory between the tool accessory holding member and the tool accessory driving shaft in order to hold the tool accessory and a release position to release the clamping of the tool accessory in order to remove the tool accessory, and
    a holding mechanism for holding the tool accessory holding member in the clamp position, wherein:
    the holding mechanism includes an engagement member that can engage with the tool accessory holding member in the clamp position, and a biasing member that biases the engagement member so as to provide the engagement member with a force of holding the tool accessory holding member in the clamp position, and
    the engagement member is disposed within the body housing.

2. The power tool as defined in claim 1, comprising:
    a transmitting member that is connected to the tool accessory driving shaft and transmits rotation of the motor to the tool accessory driving shaft, wherein:
    the tool accessory is held on a first end of the tool accessory driving shaft and the engagement member is disposed on a second end region of the tool accessory driving shaft that is opposite the first end in an axial direction of the tool accessory driving shaft, and
    the transmitting member is connected to the tool accessory driving shaft between the first end and the second end region of the tool accessory driving shaft.

3. The power tool as defined in claim 2, wherein the biasing member is disposed between the second end region of the tool accessory driving shaft and the transmitting member and biases the engagement member in the axial direction of the tool accessory driving shaft.

4. The power tool as defined in claim 1, wherein the biasing member includes two spring elements disposed oppositely to each other across the tool accessory driving shaft.

5. The power tool as defined in claim 1, wherein:
    the body housing has an elongate shape extending in a direction crossing the axial direction of the tool accessory driving shaft,
    the power tool comprises a biasing force releasing mechanism that releases a biasing force of the biasing member from the engagement member and allows the tool accessory holding member to move to the release position, and
    the biasing force releasing mechanism is arranged to overlap the tool accessory driving shaft when viewed from a direction perpendicular to the axial direction of the tool accessory driving shaft and to the crossing direction.

6. The power tool as defined in claim 5, wherein the biasing force releasing mechanism comprises an operation part which is operated by a user, and a biasing force releasing member that is connected to the operation part and releases a biasing force of the biasing member.

7. The power tool as defines in claim 5, wherein the biasing force releasing member is configured to rotate around a rotation axis extending in a direction perpendicular to the axial direction of the tool accessory driving shaft and to a crossing direction in which the body housing extends and which crosses said axial direction.

8. The power tool as defined in claim 5, wherein the biasing force releasing member has an eccentric shaft formed in a position displaced from the rotation axis.

9. The power tool as defined in claim 1, wherein the body housing includes an inner housing and an outer housing which houses the inner housing, and the inner housing houses at least part of the tool accessory driving shaft and the motor.

10. The power tool as defined in claim 9, wherein a vibration-proofing elastic member is disposed between the inner housing and the outer housing.

11. The power tool as defined in claim 9, wherein an operation member is provided in the outer housing and operated by a user in order to drive the power tool, and the outer housing has a grip part provided to be held by the user and formed on the opposite side of the operation member from the motor in a direction in which the outer housing extends.

12. The power tool as defined in claim 1, wherein the body housing includes a first housing component arranged close to the tool accessory and a second housing component arranged apart from the tool accessory in the axial direction of the tool accessory driving shaft, the first and second housing components being connected together.

13. The power tool as defined in claim 1, further comprising:
    a first bearing and a second bearing that rotationally support the tool accessory driving shaft, the first bearing being disposed closer to the tool accessory than the second bearing; and
    a transmitting member that is connected to the tool accessory driving shaft between the first and second bearings and that transmits rotation of the motor to the tool accessory driving shaft,
    wherein:
    the transmitting member is disposed closer to the first bearing than to the second bearing.

14. The power tool as defined in claim 13, wherein the transmitting member is disposed adjacent to the first bearing.

15. The power tool as defined in claim 13, wherein:
    the tool accessory driving shaft is configured to be reciprocatingly rotated by the transmitting member to reciprocatingly drive the tool accessory within a prescribed angular range around an axis of the tool accessory driving shaft.

16. The power tool as defined in claim 15, wherein the transmitting member is coupled to a non-spherical drive bearing that is positioned on an eccentric portion that is rotated around the rotation axis of the motor.

* * * * *